United States Patent [19]

Kakii et al.

[11] Patent Number: 4,722,584
[45] Date of Patent: Feb. 2, 1988

[54] OPTICAL CONNECTOR FERRULE AND PROCESS FOR PRODUCTION THEREOF

[75] Inventors: Toshiaki Kakii; Koichiro Matsuno, both of Kanagawa; Norio Kashima, Ibaraki, all of Japan

[73] Assignees: Sumitomo Electric Industries Ltd.; Nippon Telegraph & Telephone Public Corporation, both of Japan

[21] Appl. No.: 714,760

[22] Filed: Mar. 22, 1985

[30] Foreign Application Priority Data

Mar. 22, 1984 [JP] Japan .................. 59-54798

[51] Int. Cl.⁴ .................. G02B 6/36
[52] U.S. Cl. .................. 350/96.20; 350/96.21
[58] Field of Search .................. 350/96.20, 96.21, 96.22

[56] References Cited

U.S. PATENT DOCUMENTS

| | | | |
|---|---|---|---|
| 4,173,389 | 11/1979 | Curtis | 350/96.20 |
| 4,220,398 | 9/1980 | Dalgoutte | 350/96.21 |
| 4,264,128 | 4/1981 | Young | 350/96.20 |
| 4,310,216 | 1/1982 | Pellaux | 350/96.21 X |

FOREIGN PATENT DOCUMENTS 2121979  1/1984  United Kingdom .

OTHER PUBLICATIONS

Patent Abstracts of Japan, vol. 7, No. 105 (P-195) [1250], May 7, 1983.

*Primary Examiner*—John Lee
*Assistant Examiner*—Frank González
*Attorney, Agent, or Firm*—Sughrue, Mion, Zinn, Macpeak, and Seas

[57] ABSTRACT

An optical connector ferrule and a method for producing such an optical connector ferrule wherein the bonding between a metal sleeve and the main body of the ferrule, which is made of a synthetic resin material, is markedly improved. A rearward end of the metal sleeve is embedded in the synthetic resin material, preferably, around a flange of the main body. The metal sleeve may be provided with irregularities on one or both of the inner and outer surfaces thereof to further improve the adhesion between the resin of the main body and the metal sleeve.

7 Claims, 16 Drawing Figures

OPTICAL CONNECTOR FERRULE AND PROCESS FOR PRODUCTION THEREOF

BACKGROUND OF THE INVENTION

The present invention relates to an improved ferrule used to form an optical connector for optical fibers. The ferrule is used to connect optical fibers by joining pairs thereof in a holding sleeve. Mechanical properties of optical connector ferrules greatly affect the connecting characteristics of optical fibers.

Optical connector ferrules using a metal sleeve on the outer periphery thereof have previously been proposed in the art. An example of such an optical connector ferrule in which a metal sleeve is provided around the outer periphery of one portion thereof is disclosed in Japanese Published Unexamined Patent Applications Nos. 42207/81 and 27112/83. A modification of such a structure in which the metal sleeve is prevented from separating from the synthetic resin material forming the body of the ferrule is disclosed in Japanese Utility Model Publication No. 38487/81. In the optical ferrule of the Utility Model Publication, radial holes are formed in the metal sleeve into which flows the synthetic resin material at the time of molding.

FIG. 1 is a cross-sectional schematic illustration of an optical connector ferrule as disclosed in the above-mentioned Japanese Published Unexamined Patent Applications. In this ferrule, a body 3 of synthetic resin material is formed with a radially extending flange 31. A coated optical fiber 1 extends through most of the length of a central longitudinal bore in the body 3. A forward end 2 of the optical fiber 1 is stripped of its protective coating. A metal sleeve 4 is disposed around the forward end of the body 3, extending from the forward side of the flange 31 to the forward end of the body 3.

Epoxy resins typically used to form the body 3 of the optical ferrule have a shrinkage upon curing at about 0.490 to 0.670 percent. This degree of shrinkage is larger than the coefficient of thermal expansion of the metals typically used to form the metal sleeve 3. Accordingly, the resin and sleeve have a tendency to separate following curing. If the inner diameter of the metal sleeve 4 is, for instance, 2 mm, the resin may shrink by about 10 microns, producing an equal amount of eccentricity in the position of the optical fiber. This results in a large amount of loss when a connection is made.

In order to prevent separation of the metal sleeve from the main body of the ferrule, as proposed in the above-mentioned Japanese Utility Model Publication, radial holes may be formed in the metal sleeve so that the resin flows therein during molding, thereby tightly securing the metal sleeve to the body of resin material. However, providing such holes in the metal sleeve requires extra processing, significantly increasing the overall cost of the ferrule. Moreover, the resin flowing through the holes in the metal sleeve changes the overall outer diameter of the ferrule, which is disadvantageous in achieving accurate alignment between connected optical fibers.

Another important problem with the conventional optical ferrule is a lack of bending strength. In the conventional optical connector ferrule as shown in FIG. 1 wherein the metal sleeve extends from the side of the flange to the forward end of the resin body, the maximum bending strength is about 2 kg. It is desirable that the bending strength of the connector be at least twice that value.

Another drawback of the conventional optical connector ferrule arises during the polishing of the end surface of the bared optical fiber 1. To polish the end of the optical fiber 1, it is necessary to polish the resin material and metal simultaneously, which is quite difficult to do because of the different hardnesses among the three materials.

SUMMARY OF THE INVENTION

Accordingly, it is an object of the present invention to provide an optical connector ferrule in which the above-mentioned problems of the prior art are eliminated.

More specifically, it is an object of the present invention to provide an optical connector ferrule which provides a high adhesion strength between the metal sleeve and body of resin material, which optical ferrule can be produced inexpensively.

It is a further object of the present invention to provide such an optical connector ferrule having an improved bending strength.

Attaining the above and other objects, the present invention provides an optical connector ferrule composed of a body of synthetic resin material having a radially extending flange and a metal sleeve surrounding that portion of the body of synthetic resin material forward of the flange, wherein a rear end of the metal sleeve is embedded in the synthetic resin material of the main body at the boundary between the flange and the remainder of the body. It is preferred that the forward end of the main body protrude past the end of the metal sleeve and have a tapered configuration forward of the metal sleeve. Further, to improve the adhesion between the main body and the metal sleeve, the inner surface of the metal sleeve and the outer surface of the main body in contact with the metal sleeve may be made irregular.

Yet further, the invention attains the above and other objects by providing a process for producing an optical connector ferrule comprising the steps of: providing a first mold having a cylindrical longitudinal passage formed therein, an annular recess at a first end thereof, and a member having a conically shaped inner surface at a second end thereof; providing a second mold having a cylindrical passage and a resin injection opening; placing said second mold over said first mold with longitudinal passages thereof aligned; inserting a metal sleeve into said longitudinal passage in said first mold conforming on an outer surface thereof to an inner surface of said longitudinal passage and extending from said conical member into at least a portion of said annular recess; placing an optical fiber from which a coating has been stripped from a forward end thereof in said longitudinal passage with said forward end extending through an aperture in said conical portion; injecting a synthetic resin material through said resin injection opening into that first and second molds; allowing said synthetic resin to solidify; and removing the completed ferrule from said first and second molds.

If desired, the optical fiber may be replaced by a metal pin during molding. In this case, once the resin has hardened, the metal pin is removed and the optical fiber secured in the resulting hole with an adhesive or the like.

DESCRIPTION OF THE PREFERRED EMBODIMENTS

Figure 1:
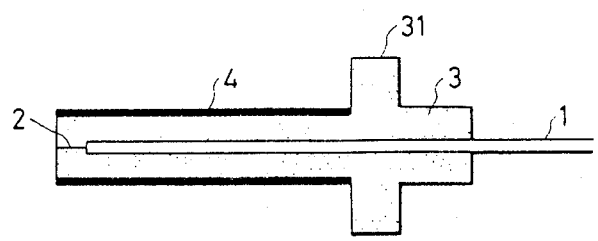
FIG. 1 is a cross-sectional schematic illustration of a conventional optical connector ferrule.
Figure 2A:
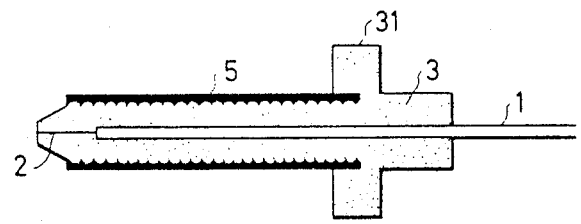
FIGS. 2A and 2B are cross-sectional schematic illustrations of optical connector ferrules produced in accordance with the present invention.

Referring now to FIG. 2A, there is shown therein in cross section a schematic diagram of a first preferred embodiment of an optical connector ferrule of the present invention. In FIG. 2A and subsequent drawings, like reference numerals employed in FIG. 1 indicate similar parts.

In the embodiment shown in FIG. 2A, a portion of the rear end of the metal sleeve 5 is embedded in the resin material of the main body 3 at the junction between the flange 31 and the remainder of the main body 3. Additionally, the inner surface of the sleeve 5 and the outer surface of the forward portion of the main body 3, that is, the portion of the main body 3 forward of the flange 31, are roughened. More particularly, the inner surface of the sleeve 5 is roughened prior to injection of the resin material during the molding process so that the resin material of the main body 3 conforms tightly to the inner surface of the metal sleeve 5. The manufacturing process will be discussed in more detail below with reference to FIGS. 4A through 4C and FIG. 5.

Further, the ferrule of the present invention differs from the conventional ferrule of FIG. 1 in that the forward end of the body 3 protrudes in a conical form past the forward end of the metal sleeve 5.

In the embodiment of FIG. 2A, as will be explained in more detail below, the optical fiber 1 having the bared end 2 is inserted into the mold which is used to form the main body 3 before the injection of the resin material. On the other hand, in the embodiment of FIG. 2A, a molding pin 51 is provided in place of the optical fiber 1 during the molding process. After the resin material has hardened, the pin 51 is then extracted and the optical fiber 1 inserted into the longitudinal opening formed by the presence of the pin 51 during the molding process. The optical fiber 1 is secured in the optical passage with an adhesive.

Figure 2B:
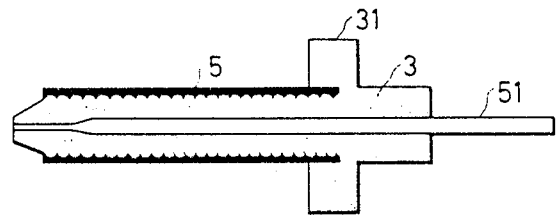

In either the embodiment of FIG. 2A or 2B, the following dimensions may be used: outer diameter of ferrule = 2.499 ± 0.001 mm, length from forward end of optical fiber to flange = 8 mm, thickness of flange = 4 mm, distance from rear side of flange to rear end of main body = 4 mm, and length of exposed metal sleeve = 7 mm.

It is preferred that the inner surface of the metal sleeve 5 be roughened by forming a screw thread therein. For instance, the depth of the screw thread may be about 0.24 mm.

Figure 3:
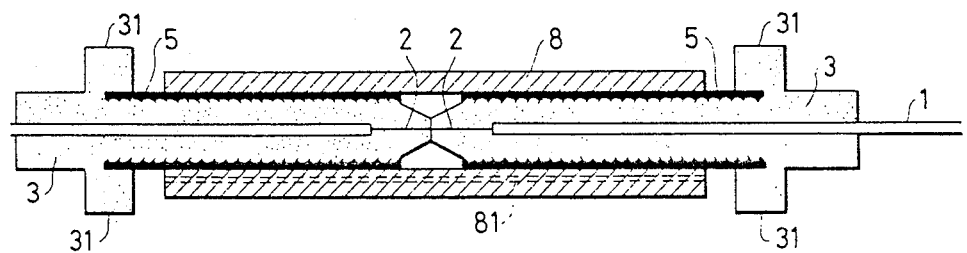
FIG. 3 is a cross-sectional view showing two optical connector ferrules of the invention joined with a connecting sleeve.

An arrangement whereby two ferrules of the type illustrated in FIG. 2A are joined together is shown in FIG. 3. As shown in this figure, two optical ferrules are joined by inserting them into opposite ends of a sleeve 8 made of metal or plastics. Preferably, a longitudinally extending slit 81 is formed in the sleeve 8 so as to make the sleeve resilient in the radial direction to firmly hold the two optical ferrules together. It is noted that, because the forward bared ends 2 of the optical fibers 1 extend in the conical part of the main bodies 3 past the forward ends of the metal sleeves 5, there is no interference between adjacent metal sleeves 5 in achieving alignment between the ends of the two optical fibers.

Figure 4A:
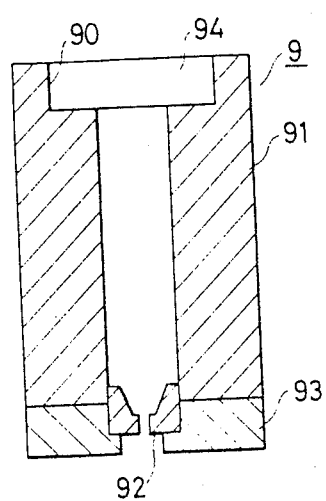
FIGS. 4A through 4C illustrate steps in manufacturing an optical connector ferrule of the invention.
Figure 4B:
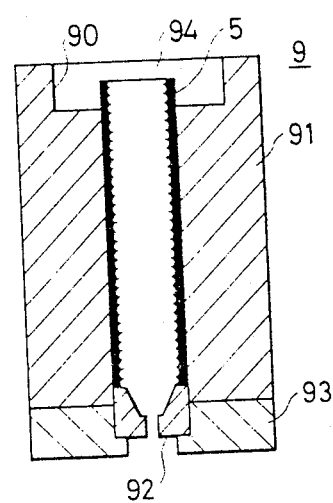
Figure 4C:
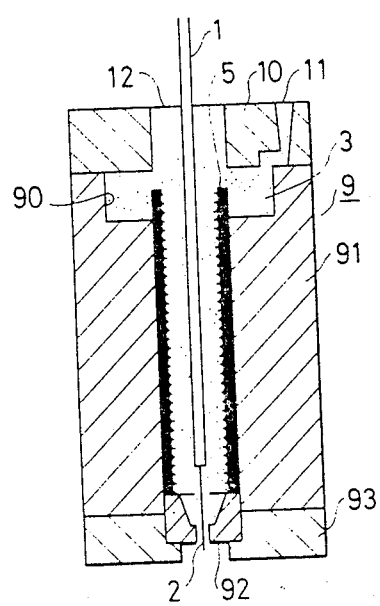

Referring now to FIGS. 4A through 4C, a preferred embodiment of a process for producing an optical connector ferrule of the type illustrated in FIG. 2A will be discussed. In FIGS. 4A to 4C, a lower mold 9 has a central part having a cylindrical passage formed therein. A flange-forming annular recess 91 is formed at an upper end of the mold 9. At the lower end of the cylindrical longitudinal passage is inserted a member 92 having a conically shaped inner surface. A supporting part 93 retains the member 92 in the lower end of the mold 9. An upper mold 10, shown in FIG. 4C, has a longitudinally extending cylindrical passage 12 located coaxially with the cylindrical passage in the lower mold 9 when the upper mold 10 is set in place as illustrated in FIG. 4C.

As shown in FIG. 4B, first, a metal sleeve 5 is inserted into the cylindrical passage in the lower mold 9. The length of the metal sleeve 5 is such that the upper (rearward) end thereof protrudes somewhat into the annular recess 91. Preferably, the metal sleeve 5 is provided with a screw thread on its inner surface. The mold is dimensioned such that a tight fit is achieved between the outer surface of the metal sleeve 5 and the inner surface of the longitudinal passage in the mold 9 so as to prevent the flow of resin therethrough. The hole in the member 92 should be accurately centered, preferably, to an accuracy of 3 microns or less. The diameter of this hole is preferably approximately 130 microns.

Figure 6:
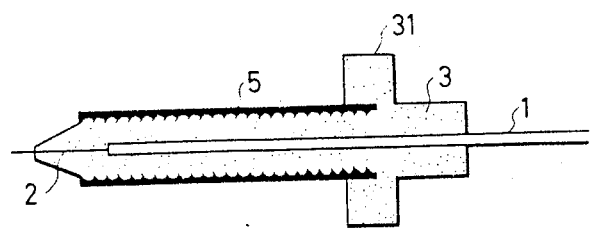
FIG. 6 is a cross-sectional view showing the optical connector ferrule after being extracted from the mold shown in FIG. 4C.

Next, after the upper mold 10 has been placed over the lower mold 9 as illustrated in FIG. 4C, the end 2 of an optical fiber 1 from which the protective coating has been stripped is inserted through the hole in the end piece 91. Preferably, the length of the bared end 2 is approximately 10 mm, typically leaving an outer diameter of about 125 microns. Following this the synthetic resin is injected through an injection hole 11 provided in the upper mold 10, thereby forming the main body 3 of the optical ferrule. After solidification of the synthetic resin material, the upper mold 10 is removed and the product removed. The product at this state is as shown in FIG. 6. All that remains to be done is to cut the forward bared end 2 of the optical fiber 1 and to polish it. Preferably, a length of approximately 0.5 mm of the bared end 2 is left protruding from the forward-most end of the body 3. Accordingly, it is not necessary to polish the material of the metal sleeve 2 or the body 3 while polishing the end of the optical fiber 1.

Figure 5:
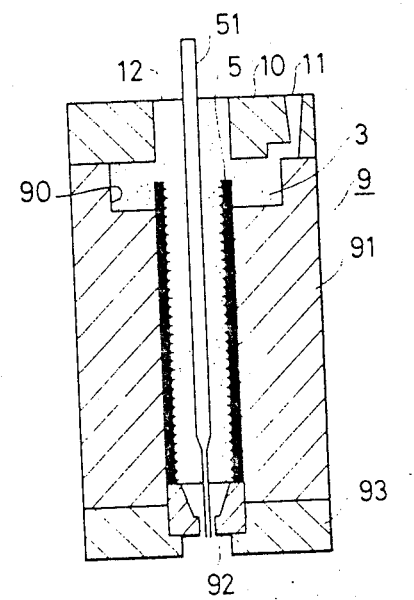
FIG. 5 illustrates in a cross-sectional view an alternative way of manufacturing an optical connector ferrule of the invention.

An alternative method of manufacturing an optical connector ferrule of the invention is illustrated in FIG. 5. As depicted therein, a molding pin 51 preferably made of metal, is placed coaxially with the cylindrical passages of the lower mold 9 and upper mold 10 after they have been assembled. A forward tapered end of the pin 51 is made to protrude through the hole in the member 92. When the pin 51 has been properly positioned, synthetic resin material is injected into the combined molds, as in the process described above. The product thus formed is extracted from the molds, and, with the pin 51 removed, the optical fiber is inserted through the hole left by the pin 51 with the bared end 2 protruding through the hole in the conical portion of the body 3. The fiber 1 is then secured with an adhesive or the like.

In either of the processes discussed above, preferably a releasing agent is applied to the outer periphery of the metal sleeve 5 and/or the inner periphery of the cylindrical passage in the lower mold 9 so as to facilitate the removal of the product.

As described above, the inner surface of the metal sleeve may be roughened by forming a screw thread therein. However, the present invention is not limited to such an embodiment. That is, a treatment such as a chemical etching treatment can be employed to roughen the inner surface of the metal sleeve.

Optical ferrules constructed in accordance with the invention as described above were tested. Specifically, a connect-and-disconnect operation was performed 1000 times, whereupon no separation of the metal sleeve from the body of synthetic resin for the optical ferrules of the invention was observed. Further, a heat-cycle test was performed wherein conventional optical ferrules and optical connector ferrules of the invention were subjected to heat cycling in a range of $-30°$ C. to $+70°$ C. 1000 times over a period of 50 days. Five of 20 samples of the conventional optical ferrule exhibited some separation between the metal sleeve and the main body of synthetic resin material. No such separation in an equal number of samples of the optical connector ferrule of the present invention was observed.

Optical connector ferrules of the invention were tested for bending strength. With the metal sleeve penetrating 2.5 mm into the resin material at its rearward end, it was found that the bending strength was approximately 5 kg, approximately twice that attainable with the conventional optical ferrule with no metal sleeve and more than twice the valve of a conventional optical connector ferrule with a metal sleeve not penetrating the material of the main body.

Further, tests were conducted to compare the amount of time required for performing the polishing operation of optical connector ferrules of the prior art and the invention. For the conventional case, typically 10 minutes was required to complete the polishing operation, while an optical connector ferrule of the invention required only approximately 3 minutes. Moreover, as a consequence, it can be expected that the service life of the polishing machine can be greatly extended.

Figure 7:
FIG. 7 shows an alternative form of a metal sleeve which may be used in another embodiment of the invention.

In FIG. 7 is shown an alternative form of the metal sleeve 5. As shown therein, a flared portion 52 is provided at the rearward end. The bending strength of the optical connector ferrule is thereby further improved.

Figure 8:
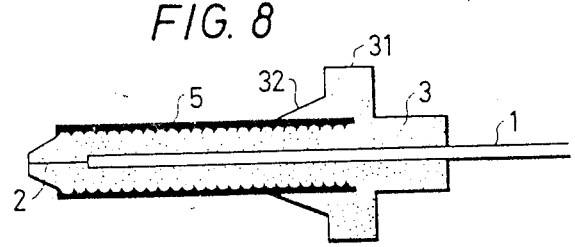
FIG. 8 is a cross-sectional schematic view of yet another embodiment of an optical connector ferrule of the invention.

In an embodiment illustrated in the cross-sectional schematic view of FIG. 8, a reinforcing part 32 is provided forward of the flange 31. It has been found in this case, for the dimensions listed above, that the bending strength of the optical connector ferrule is at least 6 kg.

Figure 9A:
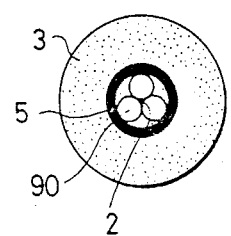
FIGS. 9A and 9B are cross-sectional end and side views, respectively, of still another embodiment of an optical connector ferrule of the invention.
Figure 9B:
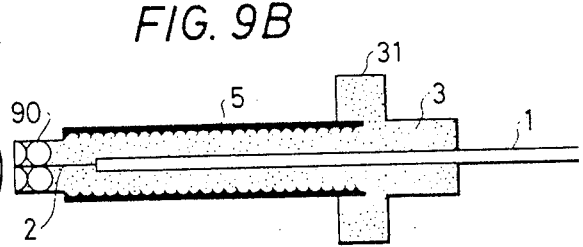

In FIGS. 9A and 9B, ceramic balls 90, 90' are provided at the forward end of the main body 3 embedded in the resin material of the main body 3. The balls may, for example, have a diameter of 0.820 mm.

Figure 10:
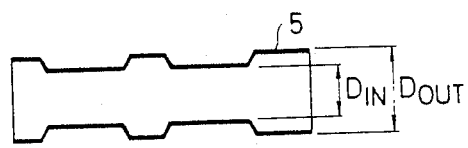
FIG. 10 is a cross-sectional view showing another type of metal sleeve which can be employed in an optical connector ferrule of the invention.
Figure 11:
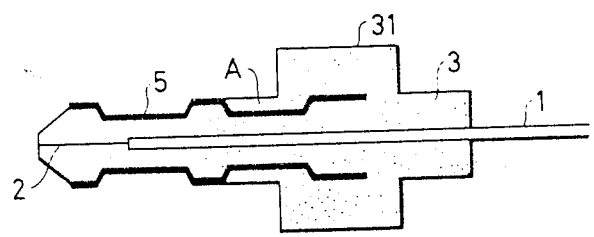
FIG. 11 shows a completed optical connector ferrule employing the metal sleeve of FIG. 10.
Figure 12:
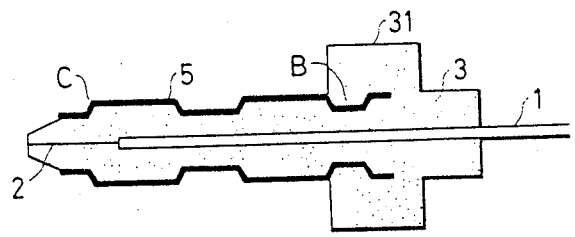
FIG. 12 shows still another embodiment of an optical connector ferrule of the invention.

Another type of metal sleeve 5 which may be used with the invention is illustrated in FIG. 10. In this case, the metal sleeve 5 has a corrugated shape having staggered cylindrical portions of different diameter $D_{in}$ and $D_{out}$. For instance, dimensions of $D_{in}=1.8$ mm and $D_{out}=2.499\pm0.001$ mm may be employed. A completed optical connector ferrule employing the metal sleeve 5 of FIG. 10 is illustrated in FIG. 11. A similar embodiment is shown in FIG. 12 wherein the disposition of the smaller- and larger-diameter portions of the metal sleeve 5 is changed. In the embodiments of FIG. 11 and 12, because the resin enters the larger-diameter portions, the adhesion between the synthetic resin forming the main body 3 and the metal sleeve 5 is further increased. In the embodiment of FIG. 11, additional strength is provided by the resin portion A, and in the embodiment of FIG. 12 by the resin portion B. In the embodiments of FIGS. 11 and 12, it is not necessary to roughen the inner surface of the metal sleeve 5, providing economic advantages over the embodiment of FIGS. 2A and 2B, for instance, in some cases.

In the embodiment of FIG. 12, the portion C is the first portion of the optical connector ferrule to touch the connecting sleeve. Accordingly, the embodiment of FIG. 12 is less subject to abrasion.

This completes the description of the preferred embodiments of the invention. Although preferred embodiments have been described, it is believed that numerous modifications and alterations thereto would be apparent to one of ordinary skill and the art without departing from the spirit and scope of the invention.

We claim:

1. In an optical connector ferrule comprising: a main body of a synthetic resin material, an optical fiber extending through said main body having a polished end at one end of said main body, and a metal sleeve constituting a part of an outer surface of said ferrule, the improvement wherein an end of said metal sleeve rearward of said optical fiber end is embedded in said synthetic resin material, wherein said metal sleeve has an irregular form and said synthetic material conforms to the inner surface of said metal sleeve.

2. The optical connector ferrule of claim 1, wherein said end of said optical fiber extends beyond a forward end of said metal sleeve.

3. The optical connector ferrule of claim 1, wherein the end of said optical fiber and an end of said main body extend beyond a forward end of said metal sleeve.

4. In an optical connector ferrule comprising: a main body of a synthetic resin material, an optical fiber extending through said main body having a polished end at one end of said main body, and a metal sleeve constituting a part of an outer surface of said ferrule, the improvement wherein an end of said metal sleeve rearward of said optical fiber end is embedded in said synthetic resin material and wherein said metal sleeve has irregularities formed on an inner surface thereof.

5. The optical connector ferrule of claim 1, wherein said end of said optical fiber and an end of said main body extend beyond a forward end of said metal sleeve.

6. In an optical connector ferrule comprising: a main body made of a synthetic resin material, an optical fiber extending through said main body having a polished end at one end of said main body, and a metal sleeve constituting a part of an outer surface of said ferrule, the improvement wherein an end of said metal sleeve rearward of said optical fiber end is embedded in said synthetic resin material and wherein said metal sleeve has irregularities extending to both inner and outer surfaces thereof.

7. The optical connector ferrule of claim 6, wherein said end of said optical fiber and an end of said main body extend beyond a forward end of said metal sleeve.

* * * * *